United States Patent [19]

McMahan

[11] 4,229,709
[45] Oct. 21, 1980

[54] LASER DEVICE

[76] Inventor: William H. McMahan, 1467 Penrose Dr., Salt Lake City, Utah 84122

[21] Appl. No.: 915,058

[22] Filed: Jun. 12, 1978

[51] Int. Cl.$^2$ ............................................. H01S 3/00
[52] U.S. Cl. ........................... 331/94.5 T; 331/94.5 G
[58] Field of Search ................. 331/94.5 G, 94.5 C, 331/94.5 T, 94.5 D, 94.5 PE

[56] References Cited

U.S. PATENT DOCUMENTS

| 3,428,915 | 2/1969 | Leone et al. | 331/94.5 D |
| 3,484,718 | 12/1969 | Foster | 331/94.5 T |
| 3,789,320 | 1/1974 | Hepburn | 331/94.5 G |
| 4,031,484 | 6/1977 | Freiberg et al. | 331/94.5 G |

Primary Examiner—William L. Sikes
Assistant Examiner—Leon Scott, Jr.
Attorney, Agent, or Firm—B. B. Olive

[57] ABSTRACT

A means is provided for continuously purging deleterious contaminants including water vapor, ozone and organic vapors from the resonant cavity of lasers where the resonant cavity is characterized by a gap-space between the gain medium and the optical mirror at both ends of the cavity with each of the gap-spaces being disposed within an enclosed chamber where the contaminants tend to collect. This is accomplished by connecting the interiors of the gap-space chambers through tubular gas conduits with one or more canisters which contain a chemical desiccant or molecular sieve capable of removing the unwanted gases or vapors. A molecular sieve comprised of zeolite with the appropriate intermolecular spacing is especially preferred.

8 Claims, 2 Drawing Figures

LASER DEVICE

BACKGROUND OF THE INVENTION

1. Field of the Invention:

This invention relates generally to laser devices, and more particularly to laser devices in which a gap-space is present between the gain medium and optical mirrors.

2. Description of the Prior Art:

It is common practice in the design of laser devices to position a gain medium between a pair of opposing optical mirrors which form the resonator. The gain medium used to sustain oscillation may extend from mirror to mirror as in some helium-neon and carbon dioxide laser devices, or the extension may be short of the mirrors with a window provided at each of the terminal ends of the gain medium. In the latter case, commonly found in solid state and ion lasers and in some types of helium-neon lasers, there remains a physical gap between the gain medium and the laser mirrors. In operation, the beam resonates between the mirrors and passes through the gain medium as well as through the intervening gap space. Although this design offers many advantages and has been widely used, the occurrence of optical losses within the resonator cavity has been a consistent and continuing problem.

Since 1961, when such lasers were placed in operation, efforts have been made to overcome or at least minimize this problem. However, because there has not been a clear understanding as to what caused the increased losses in the resonator cavity, a solution to the problem has not emerged from these efforts.

It is, of course, obvious that the cavity not properly shielded would collect dust and other foreign matter and that these materials would fall on the optical surfaces to produce scatter and absorption. Yet, the provision of a dust cover for the cavity did not eliminate the problem in that optical losses continued to be experienced and the laser components degraded with time.

Although a clear understanding of the mechanism responsible for these laser losses and deterioration has eluded investigators for many years, the basic causes of the problem can now be explained as a result of recent research efforts.

It has been found that water vapor is absorbed into the materials comprising the laser mirrors and dust seals and is somehow expelled into the optical cavity where it causes losses. This is the most common and pervasive cause of the problem. In the case of gas lasers, the presence of some UV radiation also contributes to the problem. This can be explained by the fact that energy at the UV frequency converts oxygen to ozone in the optical cavity. The resulting ozone attacks cavity materials and seals to produce contaminants which deposit on optical surfaces and become suspended in the optical pathway to cause losses and deterioration of cavity components.

In addition, organic vapors emanating from solvents used to clean the optical surfaces at times diffuse into the optical cavity as a deleterious contaminant.

Thus, it is apparent that in order to assure a long-term stable performance of these laser devices, water vapor in particular must be continuously purged from the optical cavity, and in some instances there is likewise a need to remove any accummulation of ozone and organic vapors.

SUMMARY OF THE INVENTION

A means is provided for continuously purging deleterious contaminants including water vapor, ozone and organic vapors from the resonant cavity of lasers where the resonant cavity is characterized by a gap-space between the gain medium and the optical mirror at both ends of the cavity with each of the gap-spaces being disposed within an enclosed chamber.

This is accomplished by connecting the interiors of the chambers within which the gap-spaces are disposed with one or more canisters which contain a chemical agent or agents capable of removing the unwanted gases and vapors from the internal atmosphere of the chambers.

The canister(s) are positioned proximate to the aforesaid chambers and are communicatively connected therewith through a tubular passageway which serves as a conduit for the undesired gases and vapors. A single canister may be coupled to the chambers at both ends of the laser device, or alternatively each of the chambers can be connected to a separate and independent canister.

The nature of the chemical agents used to remove the deleterious gases and vapors from the laser system is subject to wide variation, and the choice in any particular case will depend largely upon the design and operational characteristics of the laser device with which they are to be employed. For example, if the contaminating problem is limited to the presence of water vapor, any of the many compositions known to have water absorption or desiccant properties may be used. On the other hand, if in addition to water vapor, there is a further need to remove ozone and/or organic vapors from the system, a chemical composition capable of functioning as a molecular sieve to remove the components of this mixture is preferred. In the latter case, a purified and degassed, synthetic zeolite with intermolecular spacing appropriate for trapping water vapor, ozone and organic vapors is especially preferred.

DESCRIPTION OF THE PREFERRED EMBODIMENT

Figure 1:
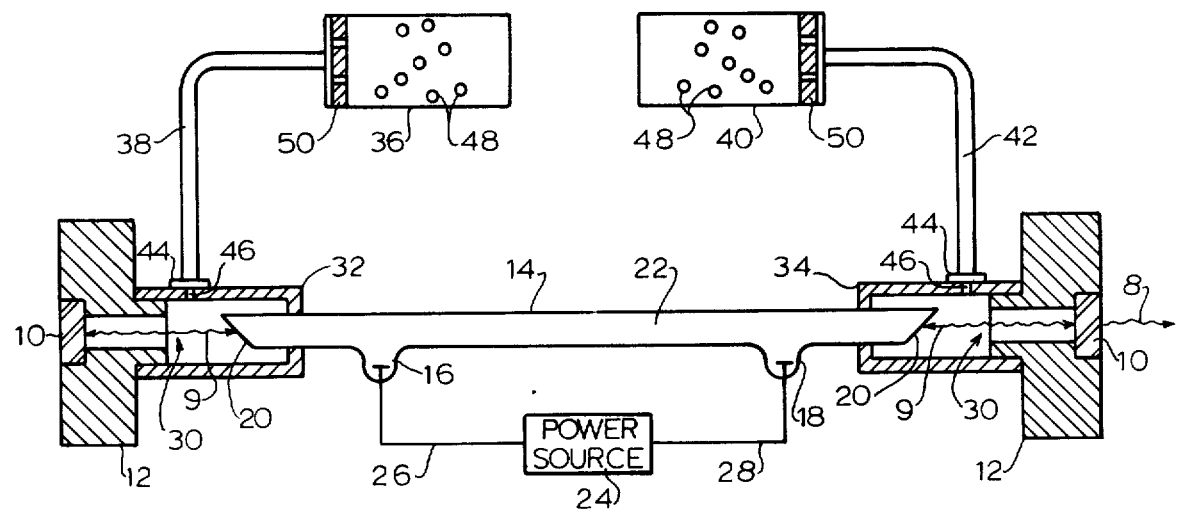
FIG. 1 is a schematic elevational view of the improved laser in accordance with this invention.

Although the invention is applicable to any type laser having a design which includes a gap-space between the gain medium and the optical mirrors, for purposes of illustration only the description which follows will focus principally on application with a gas laser. Referring now to the drawings and more particularly to FIG. 1, there is shown a resonator cavity consisting of two opposing optical mirrors 10 mounted in support members 12, with the mirrors having a high reflectance at the desired operating wavelength. Positioned in the cavity intermediate to the two optical mirrors 10 is a laser tube 14 having mounted therein a cathode 16, an anode 18, and a pair of optical transparent Brewster-type windows 20 disposed at either end of the laser tube 14 with the windows being in axial alignment with the optical mirrors 10. Sealed within the laser tube 14 is an appropriate gaseous lasing material or gain medium 22. The axially propagated radiation 9 is directed through windows 20 to the mirrors 10 which reflect the radiation back and forth a sufficient number of times to sustain laser oscillation. A degree of transmission is provided at the operating wavelength throughout at least one of the mirrors 10 to provide an output beam 8. Also shown is a power source 24 coupled to the cathode 16 and the anode 18 by leads 26 and 28, respectively. The power source provides sufficient energy to cause the gain medium 22 in laser 14 to produce electromagnetic energy at the desired wavelength in the visible range of the spectrum.

It will be noted that a gap-space 30 is present between the Brewster windows 20 and mirrors 10 at both ends of the resonant cavity with one of the gap-spaces being enclosed by chamber 32 and the other by chamber 34. Among other functions, the chamber enclosures 32 and 34 serve to prevent dust particles from entering the optical cavity.

In the embodiment of FIG. 1, the hollow interior of chamber 32 is communicatively connected to the interior of canister 36 through tubular conduit 38. Likewise, chamber 34 is coupled with canister 40 through tubular conduit 42. As shown, conduits 38 and 42 are attached to chambers 32 and 34, respectively, by flanges 44 equipped with appropriate O-rings or other means for effecting a gas tight seal with the point of attachment being such that the conduit passageway is in alignment with bores 46 which extend through the chamber wall to provide communication with the internal atmosphere of the chamber.

Contained within canister 36 and 40 is a chemical material 48 capable of removing the deleterious, gaseous and vaporous contaminants which tend to accumulate within the internal atmosphere of chambers 32 and 34. The chemicals employed are generally solids in particulate form and have a composition which provides desiccant properties and/or the capability of functioning as a molecular sieve.

In instances where the contamination is essentially limited to the presence of water vapor in the optical cavity, well-known drying agents such as phosphorous pentoxide, magnesium chlorate, potassium hydroxide, calcium oxide, zinc chloride and silica gel, to mention only a few, may be used to advantage. However, where significant amounts of ozone and/or organic vapors are also present as contaminants in addition to water vapor, a composition having the capability of functioning as a molecular sieve and adapted to remove all three types of contaminants is preferred.

An especially suitable molecular sieve consists of a synthetic zeolite having an appropriate intermolecular spacing for trapping water vapor, ozone and organic vapors. Zeolites, both natural and synthetic, are well known and may be characterized as a crystalline material consisting of a complex arrangement of hydrous aluminum silicate containing one or more of the alkali and alkaline earth metals. The essential structural scheme is a rather open but tightly linked framework of the silicate and aluminate tetrahedral groups or clusters of atoms. However, the metal ions, such as sodium or calcium, and the water molecules are relatively loosely bound within the large voids in the framework. In most zeolites the voids are interconnected so as to yield well-defined channels on an atomic scale through the crystals and it is this structural porosity which accounts for their ability to serve as molecular sieves. Although the ceramic zeolite sieves are preferred, the molecular sieves which are fabricated from organic resins may likewise be used.

Referring again to FIG. 1 of the drawings, it will be apparent that when contaminating gases or vapors accummulate in the atmospheres of chambers 32 and 34, a differential pressure will exist between chamber 32 and canister 36 and between chamber 34 and canister 40 due to the partial pressures exerted by these contaminants. This pressure difference causes the unwanted gases and vapors to diffuse through tubular passageways 38 and 42 and into canisters 36 and 40 until a partial pressure equilibrium is established between the canister and the chamber to which it is attached. As seen, the contaminating gases and vapors enter the canisters through a screen 50 which removes foreign particulate matter from the contaminants prior to contact with the chemical agents within the canister.

It will also be appreciated that the normal expansion and contraction of the gases within the chambers 32 and 34 caused by the recurring temperature changes within these chambers will tend to produce a pumping action, so to speak, by which the unwanted gases and vapors are moved towards and into the canisters 36 and 40. This thermocycling within the chamber areas also contributes to the contamination problem in that it tends to cause gases from the outside atmosphere to be pulled into and expelled from the chambers in a periodic manner such that foreign particulate matter and water vapor are brought into the optical cavity.

Figure 2:
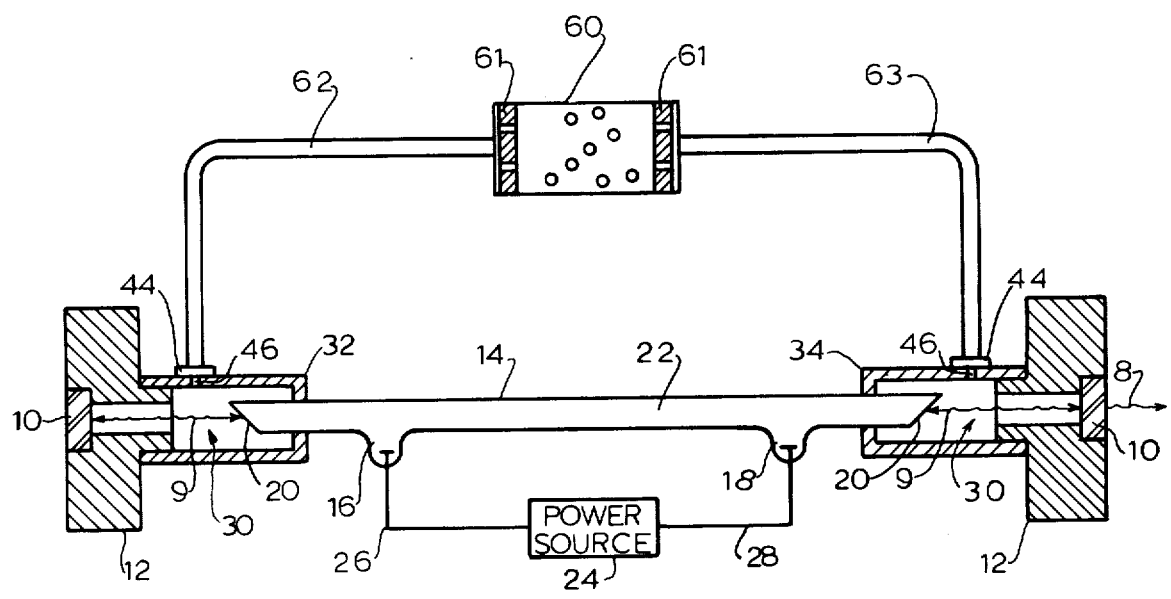
FIG. 2 is a schematic elevational view of another embodiment of the improved laser according to the present invention.

In the embodiment of FIG. 2, an alternative arrangement is illustrated wherein a single chemical-containing canister is used to serve the enclosed chambers at both ends of the laser resonant cavity. As shown, canister 60 equipped with a screen 61 at both ends thereof to remove particulate matter from entering gases is connected at one end to the interior of chamber 32 through tubular conduit 62 and at the other end to chamber 34 through conduit 63.

As has been previously noted, the chemical materials used to remove the gaseous and vaporous contaminants from the resonant cavity may be selected from a large variety of substances or combination of substances. For example, either a ceramic or resinous molecular sieve material or a chemical desiccant have been found to be highly suitable and may be used alone or in combination with various adjuvants. Such adjuvants include, for example, activated charcoal and a material capable of catalyzing the reaction whereby ozone is converted to oxygen. Among such catalytic materials is copper and it is within the purview of this invention to line the canisters and/or the gap-space chambers with copper to serve this function.

Although various specific embodiments have been illustrated, it will be appreciated that other organizations of the particular arrangements shown may be made without departing from the spirit and scope of the invention. For example, the invention is applicable with different types of chamber and resonant cavity configurations.

Accordingly, it is intended that the foregoing disclosure and drawings are to be considered as merely illustrative of the principles of this invention and are not to be construed in a limiting sense.

I claim:

1. In a laser of the type wherein the resonant cavity is characterized by a gap-space between the gain medium and the optical mirror at each end of said cavity and wherein each said gap-space is enclosed by a gap-space chamber subject to fluctuating temperature, the improvement which comprises means for removing gaseous or vaporous contaminants including water vapor, organic vapors and ozone from the areas within a said gap-space chamber with said means being comprised of: at least one canister having its interior interconnected by a tubular conduit with the interior of at least one said gap-space chamber and wherein said canister contains solid particles of a chemical agent capable of removing the gaseous or vaporous contaminants present in the said gap-space chamber, said agent comprising a material having the properties of a molecular sieve adapted to trap and hold said contaminants and with said canister and conduit being adapted to effect in conjunction with said fluctuating chamber temperature a pumping action and flow of said contaminants from said chamber to said canister.

2. The improved laser in accordance with claim 1 wherein the interior of said one canister is interconnected by a tubular conduit with the interior of the gap-space chamber at one end of said resonant cavity, and including a second canister with its interior interconnected by a separate tubular conduit with the interior of the gap-space chamber at the opposite end of said resonant cavity.

3. The improved laser in accordance with claim 1 wherein one end of said canister is interconnected by a tubular conduit with the interior of the gap-space chamber at one end of said resonant cavity and the opposing end of said canister is interconnected by a tubular conduit with the interior of the gap-space chamber at the other end of said resonant cavity and said flow is effected from both said chambers.

4. The improved laser in accordance with claim 1 wherein said chemical agent consists of a synthetic zeolite with intermolecular spacing appropriate for trapping and holding said contaminants.

5. The improved laser in accordance with claim 1 wherein said chemical agent includes a catalyst material capable of catalyzing the conversion of ozone to oxygen.

6. The improved laser in accordance with claim 5 wherein said catalyst material is copper.

7. The improved laser in accordance with claim 1 wherein said canisters are lined with copper.

8. The improved laser in accordance with claim 1 wherein each said gap-space chamber is lined with copper.

* * * * *